United States Patent
Zhang et al.

(10) Patent No.: US 11,870,904 B2
(45) Date of Patent: Jan. 9, 2024

(54) METHOD FOR ENCRYPTING AND DECRYPTING DATA ACROSS DOMAINS BASED ON PRIVACY COMPUTING

(71) Applicant: Nanhu Laboratory, Jiaxing (CN)

(72) Inventors: Lei Zhang, Jiaxing (CN); Ruiyan Xia, Jiaxing (CN)

(73) Assignee: NANHU LABORATORY, Jiaxing (CN)

( * ) Notice: Subject to any disclaimer, the term of this patent is extended or adjusted under 35 U.S.C. 154(b) by 0 days.

(21) Appl. No.: 18/157,347

(22) Filed: Jan. 20, 2023

(65) Prior Publication Data

US 2023/0388121 A1 Nov. 30, 2023

(30) Foreign Application Priority Data

May 25, 2022 (CN) .......................... 202210571691.5

(51) Int. Cl.
*H04L 9/32* (2006.01)
*H04L 9/08* (2006.01)
*H04L 9/40* (2022.01)

(52) U.S. Cl.
CPC .......... *H04L 9/3213* (2013.01); *H04L 9/0869* (2013.01); *H04L 9/0877* (2013.01); *H04L 9/0897* (2013.01); *H04L 63/0435* (2013.01); *H04L 63/0442* (2013.01)

(58) Field of Classification Search
None
See application file for complete search history.

(56) References Cited

U.S. PATENT DOCUMENTS

| | | | |
|---|---|---|---|
| 2006/0062391 A1* | 3/2006 | Lee | H04L 9/0866 380/270 |
| 2014/0108805 A1* | 4/2014 | Smith | H04L 9/3247 713/176 |
| 2015/0372991 A1* | 12/2015 | Katz | H04L 9/0819 713/168 |
| 2017/0054691 A1* | 2/2017 | Graubner | H04L 63/0428 |
| 2017/0149564 A1* | 5/2017 | McCallum | G06F 21/6209 |
| 2019/0340393 A1* | 11/2019 | Mo | G06F 21/554 |
| 2020/0044838 A1* | 2/2020 | Yoo | G06F 21/62 |
| 2020/0118201 A1* | 4/2020 | Kaneichi | G06Q 30/0645 |
| 2020/0195425 A1* | 6/2020 | Mistry | H04L 63/123 |
| 2021/0152190 A1* | 5/2021 | Dodds | H03M 13/2942 |
| 2023/0102966 A1* | 3/2023 | Barnes | H04L 9/0866 380/284 |

FOREIGN PATENT DOCUMENTS

CN 114553603 A 5/2022

\* cited by examiner

*Primary Examiner* — Bassam A Noaman
(74) *Attorney, Agent, or Firm* — Brown & Michaels, PC

(57) ABSTRACT

A method for encrypting and decrypting data across domains based on privacy computing is provided. A data provider deploys a base key for a data user in advance, and when the data user needs to use the data at a later stage, the data provider generates a data token about a data key based on the base key, and then transmits encrypted data and the data token to the data user. The user obtains the data key based on its own base key in a privacy environment according to the data token, and uses the data key in the privacy environment to realize use of the encrypted data. A transmission process does not involve transmission of the key; therefore, even if a transmission channel is not secure, security of the data can still be ensured, and even if private data is used, the data itself cannot be obtained.

19 Claims, 2 Drawing Sheets

METHOD FOR ENCRYPTING AND DECRYPTING DATA ACROSS DOMAINS BASED ON PRIVACY COMPUTING

CROSS REFERENCE TO RELATED APPLICATION

This patent application claims the benefit and priority of Chinese Patent Application No. 202210571691.5 filed with the China National Intellectual Property Administration on May 25, 2022, the disclosure of which is incorporated by reference herein in its entirety as part of the present application.

TECHNICAL FIELD

The present disclosure belongs to the field of data security, and in particular, relates to a method for encrypting and decrypting data across domains based on privacy computing.

BACKGROUND

At present, there is a great rigid demand for trusted sharing of data across domains, and in particular, the security problem of using some privacy-sensitive data across domains is very prominent. At present, it is a pain point in the industry to allow data to be transferred across domains safely with the data being "available but invisible" to an entrusted party. Currently common solutions in the industry are to encrypt the data in advance and send it to an user, and establish an encrypted secure connection (with for example a key management system deployed by the data provider) when the user uses encrypted data, to transmit a decryption key to the memory of the user's host for data decryption, in which the decryption key and decrypted data are not fallen into the disk. However, this solution has some defects as follows:
1. A network is connected to transmit the key during data use, and thus such solution is limited when being deployed in a single-machine intranet or in a network-free environment;
2. An encrypted secure channel (e.g., a TLS-based encrypted connection) is established for the transmission of the key during data use, but even with the secure encrypted channel, there is a risk of loss through theft during the transmission of the key;
3. There is a risk of leakage in importing the key into memory of a data user for decryption for example, extracting the key and private data based on memory scanning tools).

In order to solve the aforementioned data security problems, the applicant previously submitted a patent application with application number 2022104377904. In this solution, the data provider generates data encryption key for data encryption based on an authorized user password, application measurement values, and an authorized host identity, and the data user generates the same key to decrypt data by trustedly measuring the same values mentioned above within the privacy computing environment.

The present solution is a technical improvement to the previous solution and solves the data security problem in a simpler and more practical way through a completely different technical path, in this solution, the data encryption key adopts standard encryption key in the industry, which has higher practicality. By combining the encryption key with a base key to generate a non-private (unprotected) data token, a base key is deployed at a deployment stage in the data user based on trusted sealing technology, and the encryption key is calculated based on this base key in the privacy computing trusted environment when the data is used, which simplifies the process of encryption and decryption and improve efficiency.

SUMMARY

An objective of some embodiments of the present disclosure is to provide a method for encrypting and decrypting data across domains based on privacy computing for the above problems.

To achieve the above objective, the present disclosure adopts the following technical solutions.

A method for encrypting and decrypting data across domains based on privacy computing, including:
S1. deploying, by a data provider, a base key User_Base_Key for a user host Host_User in advance, and sealing the base key User_Base_Key to a user locally based on trusted sealing technology (for example, Intel SGXSealing);
S2. selecting, by the data provider, data Data_i, and generating a data key Data_Key_i corresponding to the data Data_i, where the data Data_i is encrypted based on the data key Data_Key_i to generate encrypted data Data_Enc_i;
S3. inputting the data key Data_Key_i to a key management application App_Key running on the data provider, where the key management application App_Key obtains a data token User_Data_Token_i based on the data key Data_Key_i and the base key User_Base_Key by a corresponding operation;
S4. transmitting the data token User_Data_Token_i and the encrypted data Data_Enc_i to the user;
S5. starting, by the user host Host_User, a privacy computing-based data user application App_user, and loading the base key User_Base_Key in a privacy computing security zone (for example, Intel SGX Enclave) based on the trusted sealing technique;
S6. obtaining, by the data user application App_user in the privacy computing security zone, the data key Data_Key_i based on the base key User_Base_Key and the data token User_Data_Token_i through a corresponding operation;
S7. decrypting the encrypted data Data_Enc_i using the data key Data_Key_i to obtain the data Data_i, computing a result Result_i based on the data Data_i, outputting the result Result_i, destroying the data Data_i and the data key Data_Key_i, and exiting the privacy computing security zone.

Here the relevant technical person should know that a person with highest authority for a data user host cannot snoop and obtain the base key User_Base_Key of the data key, the data key Data_Key_i and decrypted data Data_i within the privacy computing security zone.

In the above method, in S1, when the user host Host_User is located within a range of the data provider in a deployment stage, the deploying a base key User_Base_Key for a user host Host_User includes:
A1. generating, by the data provider, the base key User_Base_Key, and storing it;
A2. starting, by the user host Host_User, the privacy computing-based data user application App_user, and reading, by a privacy computing trusted environment, the base key User_Base_Key stored by the data provider;

A3. sealing, by a user host application, the base key User_Base_Key to the user locally based on the trusted sealing technology.

In the above method, in S1, when the user host Host_User is located outside a range of the data provider in a deployment stage, the deploying a base key User_Base_Key for a user host Host_User includes:

B1. confirming, by a provider host Host_Provider, the user host Host_User;

B2. starting, by the provider host Host_Provider, a privacy computing-based key management application App_Key in advance or at this time, and randomly generating in a trusted environment the base key User_Base_Key corresponding to the user host Host_User confirmed in B1;

B3. starting, by the user host Host_User, the privacy computing-based data user application App_user, and establishing a trusted connection to a privacy computing trusted environment of the application App_Key on Host_Provider based on a privacy computing remote authentication mechanism;

B4. sending, by the provider host Host_Provider, the base key User_Base_Key to a privacy computing trusted environment of the data user application App_user on the user host Host_User based on the trusted connection in B3;

B5. sealing, by the privacy computing trusted environment of the data user application App_user, the base key User_Base_Key locally based on the trusted sealing technology.

In the above method, in B2, the provider host Host_Provider credibly seals the base key User_Base_Key locally by using the trusted environment, based on the trusted sealing technology.

In the above process, the generation, transmission, and deployment of User_Base_Key to the data user are based on the end-to-end encryption process of privacy computing, so that even the data provider cannot obtain it in clear text, which provides extremely high security.

As an option, if Host_Provider is at a fully trusted end, the application App_Key in B2 above does not necessarily run in a trusted environment, and this application randomly generates the base key User_Base_Key of the user host Host_User confirmed in B1.

To provide high security, the generation of the data key Data_Key_i in S2 above can also be in a privacy computing environment.

In the above method, in S2, the data provider generates the data key Data_Key_i corresponding to the data Data_i based on a standard encryption algorithm.

In the above method, in S2, the data provider generates the data key Data_Key_i corresponding to the data Data_i based on an AES symmetric encryption algorithm.

In the above method, the corresponding operation in S3 is an exclusive OR operation:

User_Data_Token_i=User_Base_Key⊕Data_Key_i;

the corresponding operation in S6 is an exclusive OR operation:

Data_Key_i=User_Base_Key⊕User_Data_Token_i.

In the above method, the corresponding operation in S3 and the corresponding operation in S6 are a symmetric encryption method: the data key Data_Key_i in the key management application App_Key is encrypted by the base key User_Base_Key to generate User_Data_Token_i; the data user application App_user decrypts User_Data_Token_i received by the user through using the base key User_Base_Key to obtain Data_Key_i.

In the above method, in S4, the data provider transmits the data token User_Data_Token_i and the encrypted data Data_Enc_i to the user in an online or offline manner, via secure connection or non-secure connection.

In the above method, when data Data2_i in the data Data_i needs to be perform persistence, the method further includes:

S81. encrypting and falling, by using the data key Data_Key_i, the data Data2_i into a disk, and saving the data token User_Data_Token_i;

S82. repeating S5-S7 in next use;

wherein, when the data provider is a secure USB flash disk, S2 and S3 are replaced by the following steps:

a PIN code PIN_USB for securely reading the data Data_i in the secure USB flash disk is divided into PIN_BASE and PIN_USER;

PIN_USB=Data_Key_i, PIN_BASE=User_Base_Key, PIN_USER=User_Data_Token_i:

in S4, when the secure USB flash disk is connected to the user host Host_User, PIN_USER is transmitted to the user host Host_User, and the user host Host_User obtains PIN_BASE and PIN_USB in sequence through S5 and S6, and then uses PIN_USB to securely read the data in the secure USB flash disk through S7.

The advantages of the present disclosure are as follows.

The data provider encrypts the data ; and the encrypted data is sent to the data user. A data encryption key does not need to be transmitted to the data user during use. In addition, the data encryption key is compatible with industry standard encryption algorithms, requires no customization and high landing property, and supports large-scale applicability and expandability of allocating different encryption keys to different data sets of the data provider.

The encrypted data Data_Enc_i and the data token User_Data_Token_i transmitted by the data provider during use of the data is non-key privacy data. Based on this information, the encryption key can be derived in the privacy computing environment of the user. However, an attacker cannot derive the encryption key or any plaintext data based on this information, so the data provider can send the encrypted data Data_Enc_i and the data token User_Data_Token_i to the data user in a non-secure way through online or offline, flexibly and inexpensively. In addition, based on privacy computing, the user cannot steal the data key and plaintext data in the whole process, which can effectively guarantee the data security and make the data "available but invisible" to the untrusted user, and there is no need to establish a real-time connection with the data provider in the process of using the data.

DETAILED DESCRIPTION OF THE EMBODIMENTS

The present disclosure will be further described in detail below with reference to the accompanying drawings and embodiments.

The embodiments provide a method for encrypting and decrypting data across domains based on privacy computing, including a deployment stage and an application stage.

The deployment stage includes a deployment method 1) and a deployment method 2) as follows.

Figure 1:
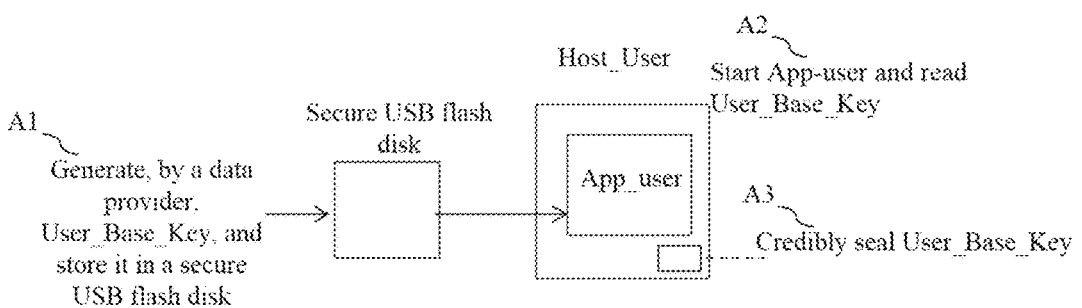
FIG. 1 is a flowchart of a deployment method 1 in a method for encrypting and decrypting data across domains based on privacy computing, according to the present disclosure.

In the deployment method 1), the deployment method can be used when a user host Host_User is located within a range of a data provider in the deployment stage, for example, applied in an application scenario of a secure USB flash disk, as shown in FIG. 1:

A1. the data provider generates a base key User_Base_Key, and stores it to the secure USB flash disk;

A2. the user host Host_User starts a privacy computing-based data user application App_user, and the application App_user running in a privacy computing trusted environment directly reads the base key User_Base_Key in the secure USB flash disk, so that no information of the base key can be read outside the privacy computing trusted environment of the user host;

A3. based on trusted sealing technology, the base key User_Base_Key is encrypted and sealed to the user locally, for example, a disk of the host Host_User.

The base key User_Base_Key can be generated locally by the data provider within a non-private computing environment, and of course, it can be generated within a private computing environment in practical application.

Figure 2:
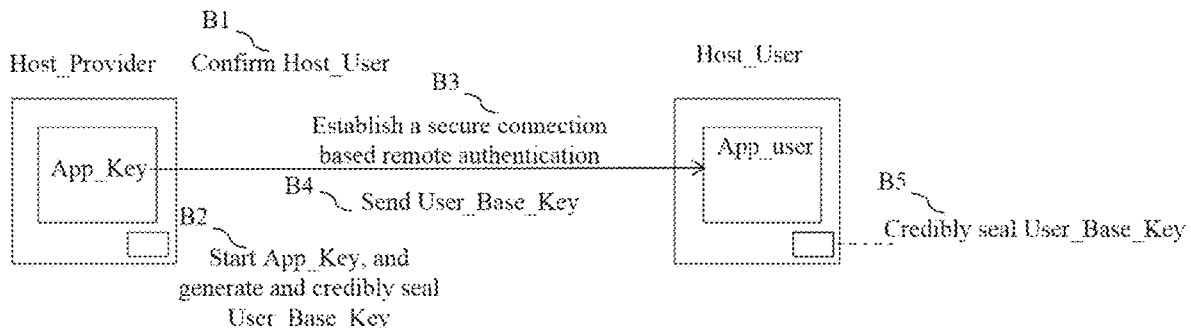
FIG. 2 is a flowchart of a deployment method 2 in the method for encrypting and decrypting data across domains based on privacy computing according to the present disclosure.

In the deployment method 2), the deployment method can be used when a user host Host_User is located outside a range of a data provider in the deployment stage, for example, located at a data user or a third deployment party, as shown in FIG. 2:

B1. a provider host Host_Provider confirms the user host Host_User that will use the data in the future;

B2. the provider host Host_Provider starts a privacy computing-based key management application App_Key in advance or at this time, and randomly generates, in a trusted environment of the application, the base key User_Base_Key corresponding to the user host Host_User confirmed in B1; preferably, the provider host Host_Provider trustily seals the base key User_Base_Key locally by using the trusted environment, based on the trusted sealing technology (for example, Intel SGX Sealing);

B3. the user host Host_User starts the privacy computing-based data user application App_user, and establishes a trusted connection to a privacy computing trusted environment of the application App_Key on Host_Provider based on a privacy computing remote authentication mechanism; this step is generally based on verification of hardware trusted measurement of the trusted environment of the application App_user and whether this measurement is in a data user whitelist, and thus a trusted secure connection is established on this basis, e.g. based on Intel SGX RemoteAttestation and Intel SGX RA-TLS mechanisms;

B4, the provider host Host_Provider sends the base key User_Base_Key to a privacy computing trusted environment of the data user application App_user in the user host Host_User based on the trusted connection in B3;

B5, the privacy computing trusted environment of the data user application App_user seals the base key User_Base_Key locally based on the trusted sealing technology (a person with highest permission level at the data user host Host_User cannot steal plaintext information of the base key User_Base_Key).

At this time, the base key User_Base_Key is randomly generated, transmitted and stored in the privacy computing-based trusted environment, no entity (including the data provider and a person with highest permission level at the data user host) can access plaintext data of the base key, and only a security encryption zonezone of a physical layer chip can access them, which ensures the high level security of the key.

Figure 3:
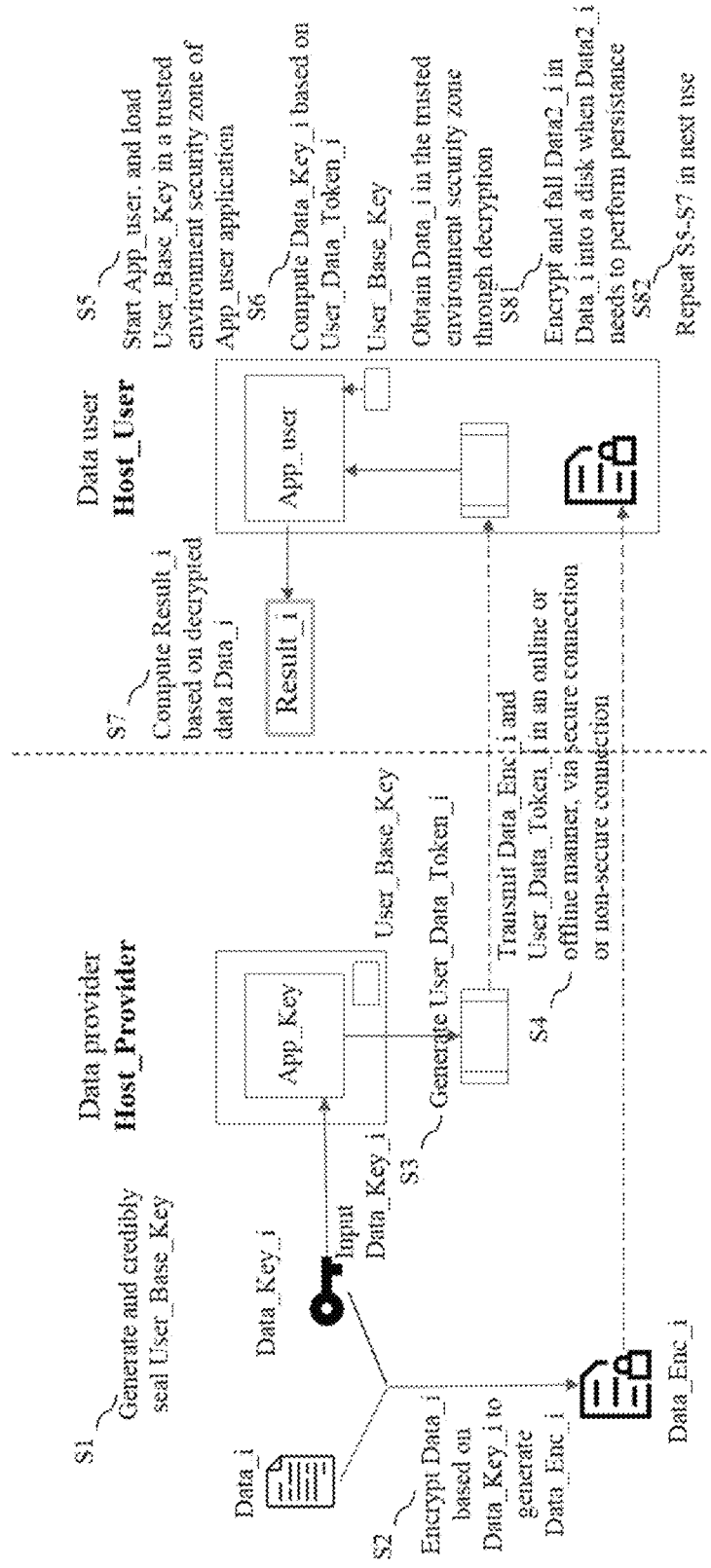
FIG. 3 is a flowchart of an application stage in the method for encrypting and decrypting data across domains based on privacy computing according to the present disclosure.

The user host Host_User enter the following application stage after deploying the base key User_Base_Key, as shown in FIG. 3.

1) The data provider has different data sets, and each data set corresponds to a different key. With a certain data Data_i as an example, the data provider generates a data key Data_Key_i corresponding to the data Data_i based on a standard encryption algorithm (e.g., AES symmetric key), and encrypts the data. Data_i based on the data key Data_Key_i to generate encrypted data Data_Enc_i.

Data_Key_i can also be randomly generated in the trusted environment by the privacy computing-based key management application App_Key in the data provider Host_Provider, and is fallen into a disk through trusted sealing technology; data encryption operation is also performed in the trusted environment. In this way, the data key Data_Key_i and the base key User_Base_Key are randomly generated, transmitted and stored in the privacy computing-based trusted environment, no entity (including the data provider and a person with highest permission level at the data user host) can access these two keys, and only the security encryption zone of the physical layer chip can access them, which ensures the higher level security of the keys.

2) The data key Data_Key_i is input into the key management application App_Key running on the data provider Host_Provider, and the key management application App_Key performs the following exclusive OR operation, i.e., $\oplus$ operation, to get User_Data_Token_i:

User_Data_Token_i=User_Base_Key$\oplus$Data_Key_i,

If, based on the deployment method 1), the above operation can also be computed by the data provider in the non-private computing environment.

3) The data provider transmits the data token User_Data_Token_i and the encrypted data Data_Enc_i to the data user in an online or offline manner, via secure connection or non-secure connection.

4) The user host Host_User starts the privacy computing-based data user application App_user, and loads a pre-deployed base key User_Base_Key in a privacy computing secure zone (e.g, Intel SGX Enclave) based on privacy computing trusted sealing technology.

5) The data user application App_user located in the privacy computing secure zone performs the exclusive OR operation on the base key User_Base_Key and the data token User_Data_Token_i to obtain Data_Key_i:

Data_Key_i=User_Base_Key$\oplus$User_Data_Token_i.

6) If the logic for computing the specific usage data is in the App_user application, the data Data_Enc_i is decrypted in the App_user application in the trusted environment security zone based on Data_Key_i to obtain Data_i;

if the logic of the specific usage data is in the other privacy computing application of the data user (App_user_2), based on the privacy computing remote mechanism (e.g. Intel SGX Remote Attestation or Intel SGX Local Attestation), a trusted connection is established between the App_user application security zone and the App_user_2 application security zone (for example, based on Intel SGX RA-TLS), so as to trustily and securely transfer Data_Key_i to App_user_2 application security zone for decryption to obtain Data_i.

7) A result Result_i is computed based on Data_i, and is outputted, then the data Data_i and the data key Data_Key_i are destroyed, and the privacy computing security zone is exited.

In another embodiment, the exclusive OR operation in 2) and 5) can also be replaced by a symmetric encryption algorithm:

the data key Data_Key_i in the key management application App_Key is encrypted by the base key User_Base_Key; the data user application App_user decrypts the User_Data_Token_i received by the, user based on the key User_Base_Key to obtain Data_Key_i.

Further, when the user needs to perform persistence on the data Data2_i in the data Data_i, the following steps are further included:

the data Data2_i is encrypted and fallen into a disk using the data key Data_Key_i, and the data token User_Data_Token_i is saved:

steps 4)-7) are repeated in next use.

The dataData2_i is a part or all of the data in the dataData_i or computation results.

In another embodiment, when the private data of the data provider is present in the secure USB flash disk and given to the data user for use, steps 1)-2) are replaced by the following steps:

a PIN code PIN_USB for protecting the data Data_i in the secure USB flash disk is divided into PIN BASE and PIN USER:

PIN_USB=Data_Key_i;
PIN_BASE=User_Base_Key;
PIN_USER=User_Data_Token_i;

in step 3), when the secure USB flash disk is connected to the user host Host_User, PIN_USER is transmitted to the user host Host_User, and the user host Host_User obtains PIN_BASE and PIN_USB sequentially through steps 4) and 5), and then securely reads the data in the secure USB flash disk by using PIN_USB through step 6). PIN_USB is computed within the security zone of the privacy computing application App_user of the data user, and directly based on this PIN_USB, the App_user security zone communicates with the secure USB flash disk to read the data. The non-security zone of the host cannot access the privacy data, and the data user (even a person with the highest permission level for the host) cannot obtain PIN_USB in the whole process, so the data in the USB flash disk cannot be stolen. The data can only be safely pulled and used based on the privacy computing application, and cannot be viewed and stolen by the user, so that the data is "available but invisible" to an entrusted user.

The specific embodiments described herein are merely examples of the spirit of the present disclosure. A person skilled in the art to which the present disclosure belongs may make various modifications or additions to the specific embodiments described or substitute them in a similar manner, without departing from the spirit of the present disclosure or going beyond the scope defined in the appended claims.

Although terms such as a user host Host_User, a base key User_Base_Key, data Data_i, a data key Data_Key_i, a data token User_Data_Token_i, encrypted data Data_Enc_i, a key management application App_Key_i, a data user application App_user, a result Result_i are used extensively herein, the possibility of using other terms is not excluded. These terms are used only to more conveniently describe and explain the nature of the present disclosure; interpreting them as any kind of additional limitation would be contrary to the spirit of the present disclosure.

What is claimed is:

1. A method for encrypting and decrypting data across domains based on privacy computing, comprising:

S1) deploying, by a data provider, a base key (User_Base_Key) for a user host (Host_User) in a trusted environment in advance, and sealing the base key (User_Base_Key) to a user locally based on trusted sealing technology;

S2) selecting, by the data provider, data (Data_i), and randomly generating a data key (Data_Key_i) corresponding to the data (Data_i) in the trusted environment, wherein the data (Data_i) is encrypted based on the data key (Data_Key_i) to generate encrypted data (Data_Enc_i);

S3) inputting the data key (Data_Key_i) to a key management application (App_Key} running on the data provider, wherein the key management application (App_Key) obtains a data token (User_Data_Token_) based on the data key (Data_Key_i) and the base key (User_Base_Key} by an exclusive OR operation or an encryption operation;

S4) transmitting the data token (User_Data_Token_i) and the encrypted data (Data_Enc_i) to the user;

S5) starting, by the user host (Host_User), a privacy computing-based data user application (App_user}, and loading the base key (User_Base_Key) in a privacy computing security zone based on the trusted sealing technology;

S6) obtaining, by the data user application (App_user), the data key (Data_Key_i) based on the base key (User Base_Key} and the data token (User_Data_Token_i) through an exclusive OR operation or a decryption operation;

S7) decrypting the encrypted data (Data_Enc_i) using the data key (Data_Key_i) to obtain the data (Data_i), computing a result (Result_i) based on the data (Data_i),outputting the result (Result_i), destroying the data (Data_i) and the data key (Data_Key_i) in the trusted environment, and exiting the privacy computing security zone;

wherein, in S1, when the user host (Host_User) is located outside a range of the data provider in a deployment stage, the deploying the base key (User_Base_Key) for the user host (Host_User) comprises:

B1) confirming, by a provider host (Host_Provider), the user host (Host_User);

B2) starting, by the provider host (Host_Provider), a privacy computing-based key management application (App_Key) in advance or at this time, and randomly generating in the trusted environment the base key (User_Base_Key) corresponding to the user host (Host_User) confirmed in B1;

B3) starting, by the user host (Host_User), the privacy computing-based data user application (App_user), and establishing a trusted connection to a privacy computing trusted environment of the privacy computing-based key management application (App_Key) on the provider host (Host_Provider) based on a privacy computing remote authentication mechanism;

B4) sending, by the provider host (Host_Provider), the base key (User_Base_Key) to a privacy computing trusted environment of the data user application (App_user) on the user host (Host_User) based on the trusted connection in B3;

B5) sealing, by the privacy computing trusted environment of the data user application (App_user}, the base key (User_Base_Key) locally based on the trusted sealing technology.

2. The method according to claim 1, wherein, in S1, when the user host (Host_User) is located within a range of the data provider in the deployment stage, the deploying the base key (User_Base_Key) for the user host (Host_User) comprises:

A1) generating, by the data provider, the base key (User_Base_Key), and storing it;

A2) starting, by the user host (Host_User), the privacy computing-based data user application (App_user), and reading, by a privacy computing trusted environment, the base key (User_Base_Key) stored by the data provider;

A3) sealing the base key to the user locally based on the trusted sealing technology.

3. The method according to claim 2, wherein in S2, the data provider generates the data key (Data_Key_i) corresponding to the data (Data_i) based on a standard encryption algorithm.

4. The method according to claim 2, wherein the exclusive OR operation in S3 is:

User_Data_Token_i=User_Base_Key⊕Data_Key_i;
and the exclusive OR operation in S6 is:

Data_Key_i=User_Base_Key ⊕User_Data_Token_i.

5. The method according to claim 2, wherein the encryption operation in S3 and the decryption operation in S6 are a symmetric encryption method: the data key (Data_Key_i) in the key management application (App_Key) is encrypted by the base key (User_Base_Key) to generate the data token (User_Data_Token_i); the data user application (App_user) decrypts the data token (User_Data_Token_i) received by the user through using the base key (User_Base_Key) to obtain the data key (Data_Key_i).

6. The method according to claim 2, wherein, in S4, the data provider transmits the data token (User_Data_Token_i) and the encrypted data (Data_Enc_i) to the user in an online or offline manner, via secure connection or non-secure connection.

7. The method according to claim 1, wherein, in B2, the provider host (Host_Provider) seals the base key (User_Base_Key) locally by using the trusted environment, based on the trusted sealing technology.

8. The method according to claim 7, wherein, in S2, the data provider generates the data key (Data_Key_i) corresponding to the data (Data_i) based on a standard encryption algorithm.

9. The method according to claim 7, wherein the exclusive OR operation in S3 is:

User_Data_Token_i=User_Base_Key⊕Data_Key_i;
and the exclusive OR operation in S6 is:

Data_Key_i=User_Base_Key⊕User_Data_Token_i.

10. The method according to claim 7, wherein the encryption operation in S3 and the decryption operation in S6 are a symmetric encryption method: the data key (Data_Key_i) in the key management application (App_Key) is encrypted by the base key (User_Base_Key) to generate the data token (User_Data_Token_i); the data user application (App_user) decrypts the data token (User_Data_Token_i) received by the user through using the base key (User_Base_Key) to obtain the data key (Data_Key_i).

11. The method according to claim 1, wherein, in S2, the data provider generates the data key (Data_Key_i) corresponding to the data (Data_i) based on a standard encryption algorithm.

12. The method according to claim 11, wherein, in S2, the data provider generates the data key (Data_Key_i) corresponding to the data (Data_i) based on an AES symmetric encryption algorithm.

13. The method according to claim 1, wherein the exclusive OR operation in S3 is:

User_Data_Token_i=User_Base_Key⊕Data_Key_i;
and the exclusive OR operation in S6 is:

Data_Key_i=User_Base_Key⊕User_Data_Token_i.

14. The method according to claim 1, wherein the encryption operation in S3 and the decryption operation in S6 are a symmetric encryption method: the data key (Data_Key_i) in the key management application (App_Key) is encrypted by the base key (User_Base_Key) to generate the data token (User_Data_Token_i); the data user application (App_user) decrypts the data token (User_Data_Token_i) received by the user through using the base key (User_Base_Key) to obtain the data key (Data_Key_i).

15. The method according to claim 1, wherein, in S4, the data provider transmits the data token (User_Data_Token_i) and the encrypted data (Data_Enc_i) to the user in an online or offline manner, via secure connection or non-secure connection.

16. The method according to claim 1, wherein, when a data subset (Data2_i) in the data (Data_i) needs to be stored permanently, the method further comprises:

S81) encrypting and storing, by using the data key (Data_Key_i), the data subset (Data2_i) into a disk, and saving the data token (User_Data_Token_i);

S82) repeating S4-S7 in next use;

wherein, when the data provider is a secure USB flash disk, S2 and S3 are replaced by the following steps:

a PIN code (PIN_USB) for securely reading the data (Data_i) in the secure USB flash disk is divided into a first portion (PIN_BASE) of the PIN code (PIN_USB) and a second portion (ON_USER) of the PIN code (PIN_USB);

PIN_USB=Data_Key_i, PIN_BASE=User_Base_Key, PIN_USER=User_Data_Token_i;

in S4, when the secure USB flash disk is connected to the user host (Host_User), the second portion (PIN_USER) is transmitted to the user host (Host_User), and the user host (Host_User) obtains the first portion (PIN_BASE) and the PIN code (PIN_USB) in sequence through S5 and S6, and then uses the PIN code (PIN_USB) to securely read the data in the secure USB flash disk through S7.

17. The method according to claim 1, wherein, in S2, the data provider generates the data key (Data_Key_i) corresponding to the data (Data_i) based on a standard encryption algorithm.

18. The method according to claim 1, wherein the exclusive OR operation in S3 is:
   User_Data_Token_i=User_Base_Key⊕Data_Key_i; and
   the exclusive OR operation in S6 is:
   Data Key_i=User_Base_Key⊕User_Data_Token_i.

19. The method according to claim 1, wherein the encryption operation in S3 and the decryption operation in S6 are a symmetric encryption method:
   the data key (Data_Key i) in the key management application (App_Key) is encrypted by the base key to generate the data token (User Data_Token_i);
   the data user application (App_user) decrypts the data token (User Data_Token_i) received by the user through using the base key (User_Base_Key) to obtain the data key (Data_Key_i).

\* \* \* \* \*